United States Patent [19]

Katsen et al.

[11] Patent Number: 5,539,038
[45] Date of Patent: Jul. 23, 1996

[54] INK JET INK AND PROCESS FOR MAKING SAME

[75] Inventors: Boris J. Katsen, Longmeadow; Richard S. Himmelwright, Wilbraham; Barbara J. Stewart, Springfield, all of Mass.

[73] Assignee: Rexham Graphics, Inc., South Hadley, Mass.

[21] Appl. No.: 316,834

[22] Filed: Oct. 3, 1994

[51] Int. Cl.$^6$ .......................... C08K 5/103; C08K 5/098; C09D 11/02

[52] U.S. Cl. .......................... 524/399; 524/394; 524/557; 524/503; 523/160; 523/161; 106/20 D

[58] Field of Search .......................... 524/399, 394, 524/557, 503; 523/160, 161; 106/20 D

[56] References Cited

U.S. PATENT DOCUMENTS 4,623,557 11/1986 Yamori et al. .......................... 427/44
5,017,545 5/1991 Kanda et al. .......................... 503/208

*Primary Examiner*—Paul R. Michl
*Assistant Examiner*—Olga Asinovsky
*Attorney, Agent, or Firm*—Burns, Doane, Swecker & Mathis

[57] ABSTRACT

Provided is an ink jet ink comprised of water, a pigment, a polymeric electrolyte, preferably a sodium, potassium or lithium salt of a polymeric carboxylic acid, a polyhydric alcohol and a stearate, preferably aluminum stearate. The presence of the stearate, particularly in combination with the polymeric electrolyte, provides one with an ink jet ink which upon printing makes a perfectly round dot located only on the surface of the paper. The image also dries very quickly, is of high density and is waterfast. Printing problems are also avoided, such as plugging.

The process for preparing the foregoing ink jet ink comprises comminuting a formulation containing the components followed by a separation step. The separation step is important to provide a stable dispersion of the ink formulation.

25 Claims, 3 Drawing Sheets

200K

1

INK JET INK AND PROCESS FOR MAKING SAME

BACKGROUND OF THE INVENTION

The present invention relates to an improved ink jet ink, and in particular a pigmented ink jet ink. The present invention also relates to a process for the preparation of such pigmented ink jet inks.

Ink jet recording systems are advantageous in that they make very little noise when recording, can be readily matched to color recording, and can also obtain the recorded image with high resolution at a high speed. Inks which are suitable for use in an ink jet printing system should display a consistent drop breakup length, drop velocity and, for synchronous ink jet printing, drop charge under set operating conditions. Conventional ink jet inks are complex multi-component systems based on water soluble dye(s), further containing polymers, solubilizing agents, chelating agent and biocides.

Several drawbacks plague the use of dye-containing, water-based inks. Dyes suffer a limited color selection and gamut when compared to pigments. This results in limited color reproduction. Furthermore, dyes are not as lightfast and waterfast as pigments. The water solubility of the dyes limits their use in that the images cannot get wet or be used outdoors. Dyes also tend to wick and bleed into uncoated and rough papers. The degree of spreading depends upon the paper used. Thus, the range of paper which can be used with dye-based inks is limited. In addition there is a loss in image resolution due to feathering and intercolor bleeding of image characters on the paper.

Because of the limitations of the water-soluble dye approach, researchers have worked with pigment-based inks. Although pigment-based inks are more lightfast and waterfast and can be used with a wide range of papers, it is still very difficult to obtain particles small enough which do not settle and clog the orifice of the printing system. The orifice must remain open for a wide range of operating conditions, e.g., temperature and humidity. Problems of feathering, migration and image loss can also occur with pigment inks.

Conventional processes for preparing pigment-based ink jet inks include blending ink jet materials together and then mixing and grinding with a known dispersing device such as a ball mill, homomixer, sand mill or roll mill. U.S. Pat. No. 4,597,794 describes a process wherein the pigmented ink jet ink is prepared by dispersing fine particles of pigments in an aqueous dispersion medium containing a polymer having both a hydrophilic and hydrophobic construction portion. The components were prepared using the aforementioned standard processes.

U.S. Pat. No. 5,026,427 relates to a process for making pigmented ink jet inks. The process involves mixing at least one pigment and at least one pigment dispersant in a medium comprised of water or water in a water soluble organic solvent. The pigmented ink mixture is then deflocculated by passing it through a microfluidizer.

U.S. Pat. No. 5,160,370 relates to a pigmented ink which involves a pigment, a water soluble resin, a water soluble organic solvent and water. The water soluble resin is added in an amount such that the amount of resin not absorbed on the pigment is about two percent or less. Furthermore, the water soluble organic solvent comprises at least one polyhydric alcohol and an aliphatic monohydric alcohol, such as ethanol.

Due to the complex nature of the composition of an ink, the composition and the method used to produce the ink can be quite sensitive. There is a need in the industry to improve the inks used, as well as the methods used to manufacture the inks. Solutions are directed to improving the migration and featherability of the inks when creating the image, as well as the plugging of the nozzle in the ink jet printer. Among the solutions proposed have been the following.

In European Patent Application 057119082, natural polysaccharides have been employed together with surfactants and binder. The use of the sugar, however, can create sugar water soluble substances on the surface of the image, which can destabilize and produce a white bloom on a colored background.

In U.S. Pat. No. 5,173,112, the question of nozzle plugging is addressed. Alkyl amides and cyclic amides are used as special co-solvents. U.S. Pat. Nos. 5,205,861 and 5,169,438 also address the nozzle plugging problem and employ cyclo aliphatic diol pluggage inhibitors.

U.S. Pat. No. 5,221,334 discloses nonionic and ionic mechanisms of pigmented ink stabilization. The patent describes the use of AB or BAB block copolymers with the A segment being a hydrophobic copolymer and the B segment being a hydrophilic polymer or salt. The block copolymer is neutralized by huge amounts of sodium hydroxide, and the materials are milled.

Despite the foregoing attempts to solve many of the problems which exist, there is nevertheless a need to improve the pigmented inks used in ink jet printers, both from the standpoint of the image printed and the printability of the inks.

Accordingly, one object of the present invention is to provide a novel ink jet ink composition.

Another object of the present invention is to provide an ink jet ink composition which demonstrates improved printability.

Yet another object of the present invention is to provide an ink jet ink which prints an image of high density and with high resolution, and is devoid of the problems of feathering and migration.

Another object of the present invention is to provide a process for preparing such a novel pigmented ink jet ink.

These and other objects of the present invention will become apparent upon a review of the following specification and the claims appended thereto.

SUMMARY OF THE INVENTION

In accordance with the foregoing objectives, provided is an ink jet ink comprised of water, a pigment, a polymeric electrolyte, preferably a sodium, potassium or lithium salt of a polymeric carboxylic acid, a polyhydric alcohol and a stearate, preferably aluminum stearate.

Surprisingly, the presence of the stearate, particularly in combination with the polymeric electrolyte, provides one with an ink jet ink which upon printing makes a perfectly round dot located only on the surface of the paper. The image also dries very quickly, is of high density and is waterfast. Printing problems are also avoided, such as plugging.

In another embodiment, there is provided a process for preparing the foregoing ink jet ink, which comprises comminuting the formulation followed by a separation step. The separation step is important to provide a stable dispersion of the ink formulation.

DESCRIPTION OF THE PREFERRED EMBODIMENTS

Figure 1A:
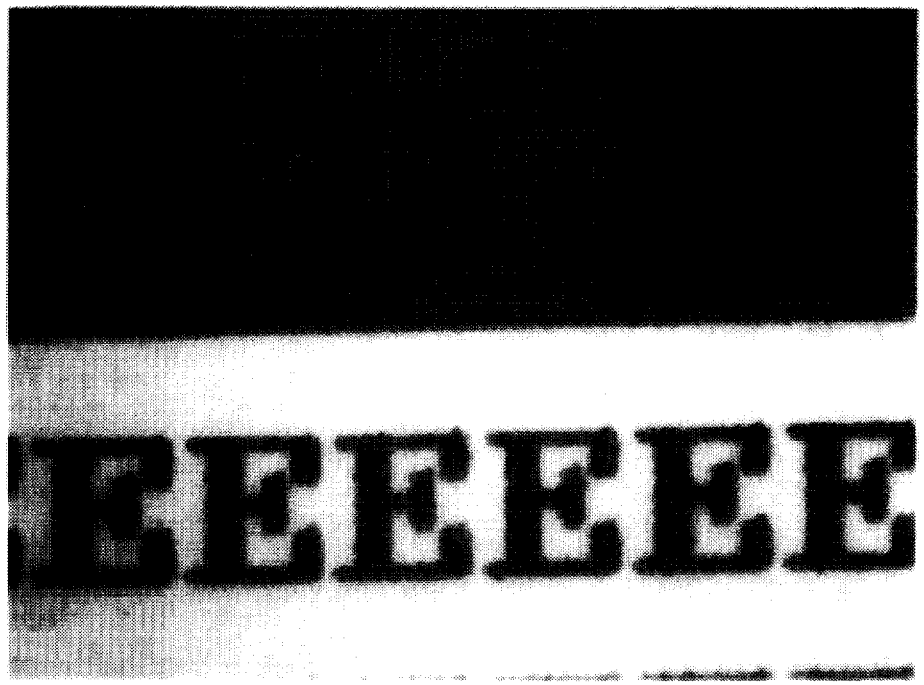
FIG. 1A is a magnified photograph (6×) of a section of an image printed in accordance with the present invention, where the image has been held under running water.

A wide variety of organic and inorganic pigments, alone or in combination, may be selected to make the ink of the present invention. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 10 micron. Preferably, the pigment particle size should range from 0.005 to 1 micron, more preferably, from 0.005 to 0.3 micron, and most preferably the size of the pigment particle should average less than 200 nm.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. A premix of the pigment already dispersed in an aqueous medium can also be used as a starting material for preparing the ink of the present invention.

Representative commercial pigments that can be used in the form of a water wet presscake include Heucophthal® Blue BT-585-P, Toluidine Red Y (C.I. Pigment Red 3), Quindo® Magenta (Pigment Red 122), Magenta RV-6831 presscake (Mobay Chemical, Harmon Division, Haledon, N.J.), Sunfast® Magenta 122 (Sun Chemical Corp., Cincinnati, Ohio), Indo® Brilliant Soarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Hansa® Yellow (Pigment Yellow 98), Dalamar® Yellow YT839-P (Pigment Yellow 74, C.I. No. 11741, Sunbrite® Yellow 17) (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Other typical pigments useful in the ink formulations of the present invention are Phthalocyanic Blue (C.I. 74260), Phthalocyanic Green (C.I. 74260), Hansa® Yellow 3G (C.I. 11670), Disazo Yellow GR (C.I. 21100), Permanent Red 4R (C.I. 12335), Brilliant Carmine 6B (C.I. 15850) and Quinacridone Red (C.I. 46500).

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Among the most preferred pigments to be used in the ink formulations and process of the present invention are C.I. Pigment Red 122, C.I. Pigment Yellow 74 and C.I. Pigment Blue 15. The present invention is particularly advantageous in its use with colored pigments.

The amount of pigment contained in the ink formulation generally ranges from 10–50 wt %, based on the total ink formulation. More preferably, the amount of pigment ranges from 10–25 wt %.

The polymeric electrolyte is preferably a polymeric carboxylic acid salt. The salt must be either the sodium, potassium or lithium salt of a carbocyclic acid, and not the ammoniated salt, for the ammoniated salts have been found not to be appropriate for printability reasons.

Among the polymeric carboxylic acid salts useful for the purposes of the present invention are the salts of the following polymers: acrylic resins such as polyacrylic acid, an acrylic acid-acrylonitrile copolymer, a potassium acrylate-acrylonitrile copolymer, a vinyl acetate-acrylic acid ester copolymer and an acrylic acid-acrylic acid alkyl ester copolymer, styreneacrylic resins such as a styrene-acrylic acid copolymer, a styrene-methacrylic acid copolymer, a styrene-methacrylic acid-acrylic acid alkyl ester copolymer, a styrene-α-methylstyrene-acrylic acid copolymer and a styrene-α-methylstyrene-acrylic acid-acrylic acid alkyl ester copolymer, a styrene-maleic acid copolymer, a styrene-maleic anhydride copolymer; a vinylnaphthalene-acrylic acid copolymer, a vinyl acetate resin such as a vinyl acetate-ethylene copolymer, a vinyl acetate-fatty acid vinyl ethylene copolymer, a vinyl acetate-maleic acid ester copolymer, a vinyl acetate-crotonic acid copolymer and a vinyl acetate-acrylic acid copolymer; as well as any polyester or cellulosic polymer salt.

Suitable surface active agents as polymer electrolytes include for example anionic surface active agents such as higher alkylsulfates, salts of a higher alcohol sulfate ester, condensation products of a higher fatty acid and amino acid, sulfosuccinates, naphthanates, salts of a liquid fatty oil sulfate ester and alkyl allyl sulfate; cationic surface active agents such as quaternary ammonium salts, sulfonium salts and phosphonium; and nonionic surface active agents such as polyoxyethylene alkyl esters, sorbitan alkyl esters and polyoxyethylene sorbitan alkyl esters.

The suitable amount of the polymeric electrolyte is in the range of from about 0.05 to 10% by weight, preferably 0.1 to 3% by weight based on the total ink formulation.

The polyhydric alcohol can be any of the well known polyhydric alcohols. Suitable polyhydric alcohols for use in the formulations of the present invention include ethylene glycol, diethylene glycol, triethylene glycol, propylene glycol, tetraethylene glycol, polyethylene glycol, glycerol, butylene glycol, ethylene glycol, monomethyl or monoethylether diethylene glycol, monomethyl or monoethylether 1,2,6-hexanetriol, and thiodiglycol. Among the polyhydric alcohols, the most preferred is polyethylene glycol, such as the commercially available PEG-200. A mixture of polyhydric alcohols can also be used, and is preferred. Such a mixture would involve, for example, diethylene glycol and polyethylene glycol.

The amount of polyhydric alcohol employed in the ink formulation is generally less than 35% by weight based on the weight of the total ink formulation, and most preferably in the range of from about 10–20 wt %. This relatively small amount of polyhydric alcohol permits fast drying of the ink as compared to conventional formulations which contain 45–55 wt % of a polyhydric alcohol. It should also be understood that the present invention does not prefer the presence of a monohydric alcohol due to the potential problem with clogging of the printing orifice, and the drying of pigment particles on the walls of ink cartridges.

The final and most important component of the ink jet ink is that of the stearate compound. A stearate compound can be any of those commercially available, such as aluminum or zinc stearate. Generally, the stearate compound can be expressed in a formula as $M(OH)_n (C_{17}H_{35}COO)_m$ where M is the metal, e.g., aluminum or zinc, n ranges from 0 to 3 and m ranges from 0 to 3.

While the stearate compound is not soluble in water, it is generally dispersed in the water solution together with the polymeric electrolyte. It is in this dispersed state that the stearate compound is added to the ink formulation. The amount of stearate compound employed generally comprises from 0.1–5% based on the total ink formulation, and more preferably from 0.1 to 3 wt %.

The use of the stearate surprisingly provides a printable ink with excellent stability and excellent image qualities. Together with the polymeric electrolyte, the ink pigments exhibit both stearic stabilization and electrokinetic stabilization.

Steric stabilization denotes a lack of agglomeration, or spacial stabilization. Steric stabilization occurs in the present invention due to the absorption of the stearate compound onto the surface of the pigment, either alone or together with the polymeric electrolyte. The absorbed molecules form a protective colloid, preventing direct physical contact of pigment particles in the dispersion. Steric stabilization occurs effectively when the pigment particles are of colloidal size, i.e., less than 1 micron, and most effectively when the particles are less than 0.2 microns in size. When sterically stabilized, the particles, even when left without agitation, do no agglomerate and do not create sediment during prolonged periods of storage.

Electrokinetic stabilization denotes that the pigment particles will not agglomerate due to electrical repulsion of the particles. Electrokinetic stabilization, together with steric stabilization, is the most desirable phenomena, which lead to a very stable dispersion of the pigment. This type of stabilization is observed in the ink jet formulations of the present invention.

The remainder of the formulation is comprised of water, generally in an amount of 40–60 wt %. All of the components can be added separately, or after several have been already mixed. For example, it is preferred that the stearate be dispersed in an aqueous medium with the polymeric electrolyte, and that this dispersion is added to complete the ink formulation comprised of the pigment.

The process of the present invention involves grinding the pigment dispersion, in order to comminute the particles, preferably until a bi-modal distribution of pigment particles is obtained. The term "bi-modal distribution" refers to a distribution of particles into at least two separate fractions of different average particle size. Generally, only two separate fractions or modes are observed. If more than two modes are observed, then the first mode will be considered the fraction of particles having the smaller average particle size and the second mode will encompass the remaining fractions.

The comminuting of the particles can take place in a single step, or in a two-step process. For example, the dispersion can first be milled in any generally appropriate and available mill, e.g., such as a ball mill, sand mill or media mill. Media mills which employ a horizontal media mill such as those manufactured by Netzsch, Eiger, Premier, and the like are efficient, and dispersions prepared using a horizontal media mill have been found to produce excellent colloidal dispersions which provide inks exhibiting excellent stability. A media mill can therefore be used to reduce the size of the particles to a certain level.

Excellent colloidal dispersions can also be prepared using other mills, e.g., an impingement mill. In fact, it has been found that use of an impingement mill is most effective and efficient in reproducibly and consistently achieving a bi-modal distribution of particles within the dispersion. An impingement mill operates by subjecting the dispersion to a pressure of as much as 23,000 psi in a hydraulic pump. The pump pushes the dispersion into a decompression chamber where the particles of the dispersion impinge on one another to comminute the particles. The comminution is effected both by the forces of impingement and cavitation. No foreign grinding medium is involved, which promotes the purity of the resulting dispersions. Descriptions of an impingement mill and their operation are also found, for example, in U.S. Pat. Nos. 4,533,254 and 4,783,502. Impingement mills are commercially available, e.g., Model M11TO or M11OY, manufactured by Microfluidics, Inc.

Once the comminuting of the pigment particles is accomplished, a separation of the dispersed particles into two fractions is made. Preferably, a bi-modal distribution of the dispersed particles is achieved, in which case the separation is into the two separate modes of particles created by the comminuting. Generally, one of the modes will have an average particle size of about 300 nanometers or less, more preferably of about 200 nm or less, and most preferably of about 150 nm or less. It is this mode which is recovered and saved for use in the preparation of the ink formulations. The dispersion comprised of the second mode of particles having an average particle size greater than 300 nanometers can be used for other applications, or may be simply returned back to the manufacturing process for further grinding and separation.

The separation step can be achieved by any appropriate means available. It is preferred, however, that microfiltration or centrifugation be employed for reasons of practicality and efficiency. In particular, centrifugation is most preferred as it has been found to be quite efficient and effective in the separation of particles of 300 nanometers and less from the bulk of larger particles.

The ink jet ink of the present invention can be printed with any conventional ink jet printer, and can be printed on any ink jet medium, e.g., plain paper, coated ink jet paper or paper suitable for outdoor use. The stability of the ink formulation also allows long storage periods without any loss of printability. Storage with the printing orifice in contact with a polyethylene glycol/water mixture, e.g., the mixture saturating a pad, has also been found to prevent nozzle clogging. If the nozzle does happen to clog, use of such a mixture as a cleaner can easily unclog the nozzle.

The present invention will be further illustrated by the following examples, which are provided purely for illustration and are not meant to be unduly limiting. Where percentages are mentioned in the following examples, and throughout the specification, the parts and percentages are by weight unless otherwise specified.

EXAMPLE 1

A Hilton-Davis premix comprised of 37% Phthalocyanine Blue pigment and the remainder water was used to prepare an ink formulation. The premix had a viscosity of 760 cps, the pH of the premix was 9.05 and the surface tension was 38 dynes/cm. The average size of the Phthalocyanine Blue pigment was about 187 nm. The premix was heated to 70° C., and then allowed to cool to 20° C. The dispersion was stable.

The dispersion was then diluted with deionized water to 19% by weight solids, having a viscosity of 10 cps, a pH of 9.1 and surface tension of 36 dynes/cm. This version was then used in an ink jet printer, and printing was attempted. The nozzle clogged almost immediately.

EXAMPLE 2

To the diluted mixture of Example 1 was added a 10% solution of an ammoniated styrene/maleic anhydride resin. The resulting dispersion contained 12½% solids, with the average particle size of the pigment being 3.4 µ due to agglomeration. Upon attempted centrifugation, the particles further agglomerated to an average particle size of greater than 6 µm. When printing was attempted, the resulting ink formulation was totally unusable, and would not print from the ink jet printer.

EXAMPLE 3

To the diluted mixture of Example 1 was added a 5% solution of a sodium salt of styrene maleic anhydride copolymer in an amount so as to provide a final dispersion of 10% by weight solids. The viscosity of the final dispersion was 20 cps and the average particle size of the pigment was 540 nm. Upon centrifugation, no separation was achieved. The average particle size was about 490 nm.

The dispersion was heated to 70° C., and then allowed to cool to 20° C. The average particle size did not change, but remained about 480 nm.

15% by weight of diethylene glycol was added, based upon the dry weight of the pigment in the dispersion.

Upon printing in an ink jet printer, the printing indicated many skips and misses, before the nozzle finally clogged. The ink formulation was unsuitable for printing applications.

EXAMPLE 4

A Sun Chemicals premix comprising an aqueous dispersion of 42% by weight yellow pigment 74, 2.5% by weight diethylene glycol, and 55.5 % by weight water, was diluted to an extent that the final dispersion contained 19% by weight solids. To this diluted mixture was added a 10% solution of ammoniated styrene maleic anhydride copolymer, with the mixture being thoroughly mixed. Precipitation of particles was immediately observed, with a small amount of particles being left in the suspended state. Those particles in the suspended state had an average particle size of 76 nm. These particles were separated by decantation, with the suspension containing about 6% solids by weight. Printing was attempted with the suspension, but no printing was possible.

EXAMPLE 5

To the diluted mixture of Example 4, was added a 5% solution of sodium salt of styrene maleic anhydride copolymer. The resulting suspension had a pigment average particle size of 330 nm, the pH was 11.02, the viscosity was 10 cps and the surface tension was 35 dynes/cm. The suspension was heated to 70° C. and then allowed to cool to 20° C. Diethylene glycol was added to the suspension in amount of about 15 wt %, with the particle size of the suspension increasing to 500 nm.

This suspension was then used to print using an ink jet printer, but the image as printed was incomplete and had many defects.

EXAMPLE 6

A sodium salt of a styrene maleic anhydride copolymer was prepared by taking 9 g of styrene maleic anhydride copolymer and adding to the solution 2.0 g of sodium hydroxide and 100 g of water. The pH of the solution was maintained in a range of 9.5 to 10 by dropwise addition of a solution of sodium hydroxide. Stirring was continued until full dissolution occurred.

350 g of a Sun Chemicals premix comprising an aqueous dispersion of 42 wt % yellow pigment 74, 2.5 wt % diethylene glycol and 55 wt % water was diluted to 20% by weight solids by adding 370 g of water to the dispersion. The above described sodium salt solution of the styrene maleic anhydride resin was then added and mixed in a Silverson high shear mixer. The resulting mixture was analyzed in a Malvern particle size analyzer, with the average particle size of the yellow pigment being about 220 nm.

The mixture was run through a microfluidizer, and after microfluidizing the mixture it was further mixed with 84 g of water and about 35 g of polyethylene glycol. The surface tension of the mixture was 33 dynes/cm. and the viscosity was 10 cps. A formulation was then used in an ink jet printer and printed an acceptable image.

EXAMPLE 7

400 g of the final ink formulation of Example 6 was centrifuged and decanted to obtain a dispersion having an average particle size of 150 nm, with the largest particle size in the distribution being less than 400 nm. The resulting mixture was then printed in a Hewlett-Packard thermal ink jet printer 500C. Several patterns of material were printed without any print defects observed. The printed image was superior to that observed with regard to Example 6.

EXAMPLE 8

An ink formulation was prepared using 43.25 wt % of a Sun Chemicals premix comprising an aqueous dispersion of 42 wt % yellow pigment 74, 2.5 wt % diethylene glycol and 55.5 wt % water by adding 42.3 wt % water, 1.25% of a 10% dispersion of a styrene maleic anhydride mixed monoisobutyl, monomethylester sodium salt, 6.5% of a 10% solution of aluminum distearate, 6.4 wt % diethylene glycol and 0.3% of polyethylene glycol 200. The formulation was passed through a microfluidizer and then subjected to a separation step by centrifugation. The average pigment particle size in the ink formulation was 154 nm. The ink formulation was printed using a Hewlett-Packard 500C printer. The ink formulation was printed without any problems. The image was a high density yellow print.

The ink was then stored for two months and printed in the Hewlett-Packard 500C printer. The quality of image was the same. Furthermore, the size of the pigment particles in the formulation was observed to be substantially unchanged.

EXAMPLE 9

An ink formulation was prepared using 32 wt % of a Sun Chemicals premix comprising an aqueous dispersion of 42 wt % yellow pigment 74, 2.5 wt % diethylene glycol and 55.5 wt % water by adding 62% water, 2% of a 10% styrene maleic anhydride monoisobutyl, monomethylester sodium salt solution, and 4 wt % of polyethylene glycol 200.

The dispersion was subjected to microfluidization in a separation step. The resulting dispersion was then printed in a Hewlett-Packard 500C printer. The nozzle clogged almost immediately and whatever printing was accomplished was of a low density image with severe defects.

EXAMPLE 10

Six parts of diethylene glycol were added to 100 parts of the formulation prepared in Example 9. This formulation was then printed with a Hewlett-Packard 500C printer. Printing began with acceptable quality, but then the quality deteriorated rapidly until the print became of low density with a high skip rate and misformation of the characters.

Examples 8–10 demonstrate the importance of the aluminum distearate in the composition. Without the aluminum distearate in the ink formulation, the print quality for the pigmented ink is quite inferior. However, when the aluminum distearate is included in the ink formulation, printing is quite easily accomplished, with the image being excellent. This is further demonstrated in the following Examples.

EXAMPLE 11

An ink formulation in accordance with Example 8 was prepared except that a magenta pigment was used. This ink formulation was then printed using a Hewlett-Packard 500C ink jet printer. The target consisted of the letter E printed on several lines, with a solid block of red color preceding the lines of the letter E. The paper on which it was printed was a coated ink jet paper.

The quality of the print was excellent, with no feathering. The image was also dry to the touch almost immediately after printing, and no penetration of the ink to the back side of the paper was observed.

The image was then put under running tap water for about 5 minutes. There was still no feathering and no migration of the color was observed either. The image remained fixed without any evidence of physical change. A magnified photograph of the image print after being held under running water is shown in FIG. 1A.

Figure 1B:
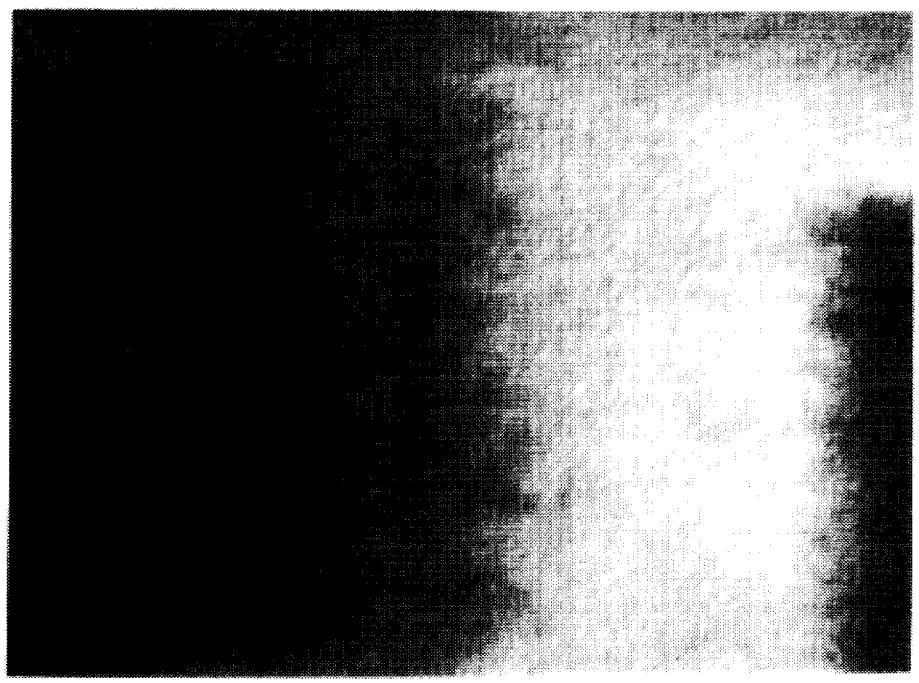
FIG. 1B is a magnified photograph (6×) of a section of an image printed with a conventional ink jet ink.

Using a conventional Hewlett-Packard ink jet ink, an image was printed on the Hewlett-Packard 500C printer and held under running tap water for about 5 minutes. As can be seen from the photograph in FIG. 1B, feathering and migration was observed.

EXAMPLE 12

Figure 2A:
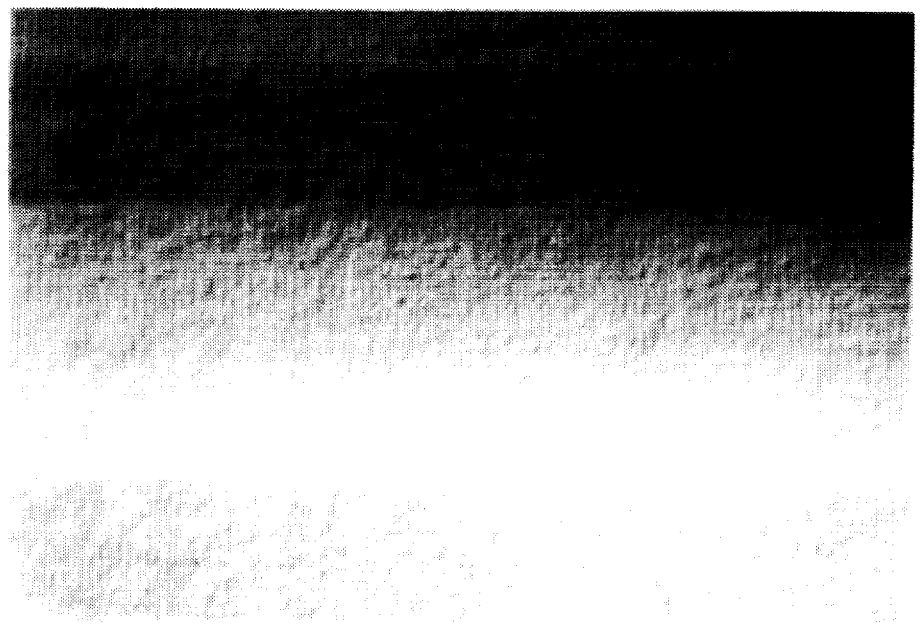
FIG. 2A is a magnified photograph (6×) of an image made in accordance with the present invention, where the image is dry.
Figure 2B:
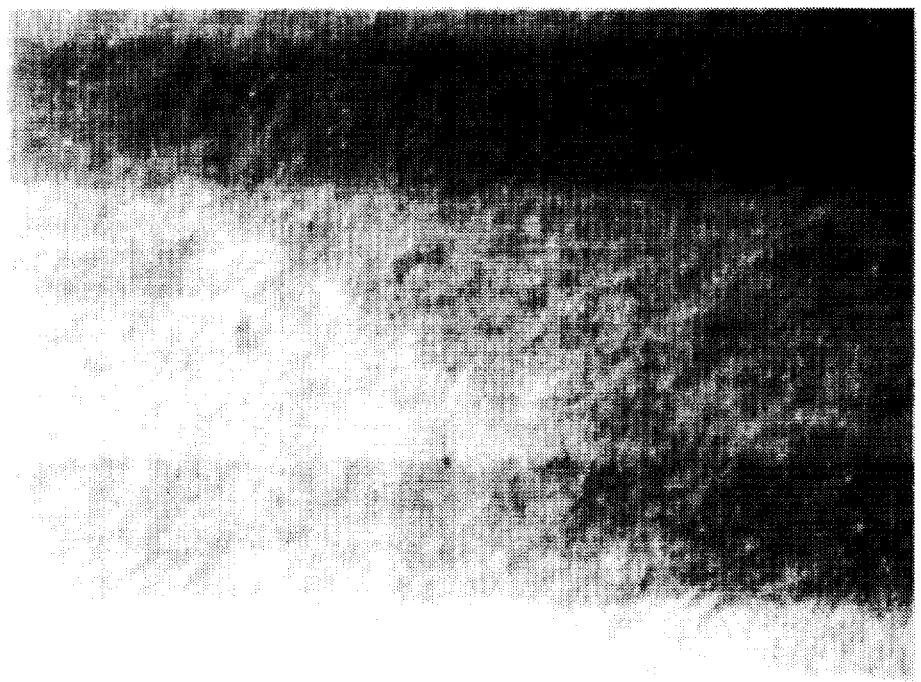
FIG. 2B is a magnified photograph (6×) of the image of FIG. 2A after it has been held under running water.

The ink formulation prepared in accordance with Example 8 was printed using a Hewlett-Packard 500C printer. The image was solid lines on a coated ink jet paper. FIG. 2A shows the image as printed after drying. The image of FIG. 2A was then held under running tap water for about 5 minutes. The photograph of FIG. 2B shows the resulting image. It is clear that there is no feathering and no migration of the color and that the image remains substantially fixed.

EXAMPLE 13

A single dot of yellow ink as prepared in accordance with Example 8 was compared to a single printed dot of a conventional blue ink. Each dot was printed using the Hewlett-Packard 500C printer. The two dots are shown side by side in FIG. 3.

Figure 3:
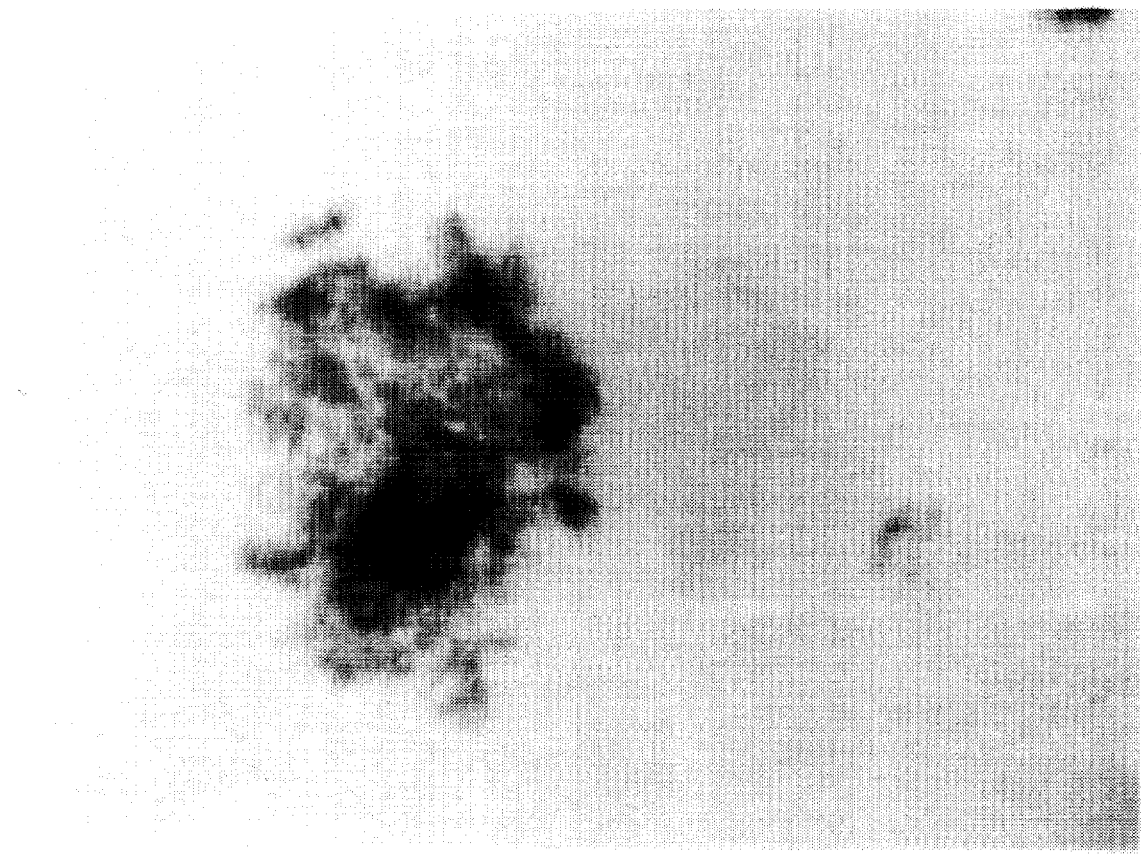
FIG. 3 is a magnified photograph (200×) of print dots, one in accordance with the present invention and one using a conventional ink jet ink.

As shown in FIG. 3, the dot of printed ink in accordance with the present invention is not fragmented but is quite compact. To the contrary, dot using the conventional ink is broken up and is not nearly as compact.

While the invention has been described with preferred embodiments, it is to be understood that variations and modifications may be resorted to as will be apparent to those skilled in the art. Such variations and modifications are to be considered within the purview and the scope of the claims appended hereto.

We claim:

1. An ink jet ink formulation comprised of pigment, water, a polyhydric alcohol, a polymeric electrolyte and a stearate compound, with the particle size of the pigment, and surface tension and viscosity of the formulation being sufficient to permit free flow through the ejecting nozzle of an ink jet printing device.

2. The ink jet ink formulation of claim 1, wherein the pigment is a colored pigment.

3. The ink jet ink composition of claim 1, wherein the polyhydric alcohol comprises polyethylene glycol.

4. The ink jet ink composition of claim 1, wherein the polyhydric alcohol comprises diethylene glycol.

5. The ink jet ink composition of claim 1, wherein the polyhydric alcohol comprises a mixture of polyethylene glycol and diethylene glycol.

6. The ink jet ink composition of claim 1, wherein the stearate compound is aluminum stearate.

7. The ink jet ink composition of claim 1, wherein the polymeric electrolyte is a sodium, lithium or potassium salt of a carboxylic acid.

8. The ink jet ink composition of claim 7, wherein the carboxylic acid salt is a salt of a styrene/maleic anhydride copolymer.

9. The ink jet ink composition of claim 1, wherein the amount of pigment in the composition ranges from 10 to 50 wt %, the amount of polyhydric alcohol ranges from 10 to 35 wt %, the amount of polymeric electrolyte ranges from 0.05 to 10 wt %, and the amount of stearate compound ranges from 0.1 to 5 wt %, with the remainder of the composition comprising water.

10. The ink jet ink composition of claim 9, wherein the amount of pigment ranges from about 10 to 50 wt %, the amount of polymer electrolyte ranges from about 0.1 to 3 wt %, and the amount of stearate compound ranges from 0.1 to 3 wt %.

11. The ink jet ink composition of claim 1, wherein the stearate compound and the polymeric electrolyte are dispersed in water, and then add to a dispersion of the pigment in water.

12. A process of printing which comprises using the ink jet ink composition of claim 1 in an ink jet printer and applying the ink to a printing medium with the ink jet printer.

13. The process of claim 12, wherein the medium to which the ink is applied is coated ink jet paper.

14. The process of claim 12, wherein the medium to which the ink is applied is plain paper.

15. The process of claim 12, wherein the medium to which the ink is applied is paper suitable for outdoor use.

16. The ink jet formulation of claim 1, wherein the average particle size of the pigment is about 0.3 microns or less.

17. The ink jet formulation of claim 1, wherein the average particle size of the pigment is about 0.2 microns or less.

18. The ink jet formulation of claim 17, wherein the pigment particle size is achieved through comminution of a dispersion containing the pigment particles so as to create a bimodal dispersion of the pigment particles, and then separating out a mode wherein the pigment particles exhibit an average particle size of from about 0.2 microns or less.

19. A process for preparing an ink jet ink composition which comprises the steps of preparing an aqueous dispersion comprising pigment, a polyhydric alcohol, a polymeric electrolyte and a stearate compound, subjecting the dispersion to comminution so as to create a bimodal dispersion of the pigment particles, and separating out one of the modes of the bimodal dispersion.

20. The process of claim 19, wherein the separation step comprises centrifugation.

21. The process of claim 19, wherein the comminution comprises passing the dispersion through a microfluidizer.

22. The process of claim 19, wherein the comminution comprises passing the pigment dispersion through a media mill.

23. The process of claim 19, wherein the mode separated has an average pigment particle size of about 0.3 microns or less.

24. The process of claim 19, wherein the mode separated has an average particle size of about 0.2 microns or less.

25. A process for preparing an ink jet ink composition which comprises the steps of preparing an aqueous dispersion comprising pigment, a polyhydric alcohol, a polymeric electrolyte and a stearate compound, subjecting the dispersion to comminution, and separating a stable dispersion having an average particle size of about 0.3 microns or less.

* * * * *